United States Patent
Strassenburg-Kleciak et al.

(10) Patent No.: US 8,918,274 B2
(45) Date of Patent: Dec. 23, 2014

(54) SELECTION AND INSERTION OF STATIC ELEMENTS IN DIGITAL MAPS

(75) Inventors: Marek Strassenburg-Kleciak, Hamburg (DE); Hendrik Meyer, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1113 days.

(21) Appl. No.: 11/868,632

(22) Filed: Oct. 8, 2007

(65) Prior Publication Data

US 2008/0215235 A1  Sep. 4, 2008

(30) Foreign Application Priority Data

Oct. 9, 2006  (EP) .................................. 06021155

(51) Int. Cl.
| | | |
|---|---|---|
| *G01C 21/00* | (2006.01) | |
| *G01C 21/36* | (2006.01) | |
| *G01C 21/32* | (2006.01) | |
| *G09B 29/10* | (2006.01) | |

(52) U.S. Cl.
CPC ............. *G01C 21/36* (2013.01); *G01C 21/32* (2013.01); *G09B 29/10* (2013.01); *Y10S 345/958* (2013.01)
USPC ........... 701/408; 701/436; 701/532; 701/301; 701/468; 701/435; 340/995.1; 340/968; 340/435; 345/440; 345/419; 345/630; 345/651; 345/958

(58) Field of Classification Search
CPC .... G01C 21/32; G01C 21/3638; G01C 21/20; G01C 21/36; G06T 17/05; G06T 13/80; B60W 2420/403; B60W 2550/402; B60W 50/14; G01S 15/025; G01S 15/931; G06F 17/30241; G06F 17/30398; G06F 17/30554
USPC ........ 701/200, 207, 208; 707/999.1, 999.003, 707/999.05, 999.2; 340/995.1, 988
See application file for complete search history.

(56) References Cited

U.S. PATENT DOCUMENTS

| | | | | |
|---|---|---|---|---|
| 6,665,676 B2 * | 12/2003 | Twig et al. | ............................. | 1/1 |
| 6,947,064 B1 * | 9/2005 | Hahn et al. | .................... | 701/301 |
| 6,971,063 B1 * | 11/2005 | Rappaport et al. | ............ | 715/733 |
| 7,460,120 B2 * | 12/2008 | Yoshida et al. | ............... | 345/427 |

(Continued)

FOREIGN PATENT DOCUMENTS

| | | |
|---|---|---|
| CN | 1769842 A | 5/2006 |
| EP | 1 681 538 A1 | 7/2006 |

(Continued)

OTHER PUBLICATIONS

Japan App. Ser. No. 2012-037078, Japanese Office Action dated Jun. 30, 2014 (English Translation).

*Primary Examiner* — Redhwan K Mawari
(74) *Attorney, Agent, or Firm* — Patterson + Sheridan, LLP (57) ABSTRACT

A navigation system may display route information that includes a display of the fixtures that are located on or near the route. The fixtures may be selected and inserted into the digital map as graphical objects. The graphical objects may be classified into a class and at least one sub-class. The classification data may be used to select and generate the graphical objects.

15 Claims, 7 Drawing Sheets

(56) References Cited

U.S. PATENT DOCUMENTS

| | | | |
|---|---|---|---|
| 7,552,008 B2 * | 6/2009 | Newstrom et al. | 701/468 |
| 7,710,291 B2 * | 5/2010 | Kim et al. | 340/995.1 |
| 7,822,541 B2 * | 10/2010 | Kumagai et al. | 701/436 |
| 2002/0055926 A1 * | 5/2002 | Dan et al. | 707/100 |
| 2003/0154021 A1 * | 8/2003 | Delling et al. | 701/208 |
| 2004/0036688 A1 * | 2/2004 | Cutlip | 345/440 |
| 2006/0287819 A1 | 12/2006 | Brulle-Drews et al. | |
| 2008/0215235 A1 * | 9/2008 | Strassenburg-Kleciak et al. | 701/200 |

FOREIGN PATENT DOCUMENTS

| | | |
|---|---|---|
| JP | 2001266177 A | 9/2001 |
| JP | 2003241655 A | 8/2003 |
| JP | 2004109800 A | 4/2004 |
| JP | 2004245581 A | 9/2004 |
| JP | 2004294166 A | 10/2004 |
| JP | 2006048070 A | 2/2006 |
| JP | 2008083353 A | 4/2008 |
| JP | 2009127862 A | 6/2009 |
| WO | WO99/01843 * | 1/1999 |

* cited by examiner

SELECTION AND INSERTION OF STATIC ELEMENTS IN DIGITAL MAPS

PRIORITY CLAIM

This application claims the benefit of priority from European Patent Application No. 06021155.4, filed on Oct. 9, 2006, which is incorporated by reference.

BACKGROUND OF THE INVENTION

1. Technical Field

This application relates to managing and displaying static elements or fixtures in two-dimensional and three-dimensional digital maps.

2. Related Art

Vehicle navigation systems analyze location and motion data provided by the Global Positioning System (GPS), motion sensors such as automatic braking system (ABS) wheel sensors, and digital maps to determine the position and velocity of a vehicle. Navigation systems generate digital maps to represent cartographic features, such as streets, intersections, signs, street lights, buildings, landmarks, parks and rivers. The digital maps may also display points-of-interest such as gas stations, restaurants, landmarks, or other points-of-interest. The navigation system provides an indicator of the vehicle's actual position on the generated digital map. Some navigation systems display route information and maneuvers needed at intersections for reaching a destination on the digital map. As the vehicle changes position, either the vehicle position mark on the displayed image changes, or the digital map may be scrolled, while the vehicle position mark remains fixed at a predetermined position.

Navigation systems may execute algorithms for transforming data from a digital database into a three-dimensional perspective view. Due to the limited computer resources, however, three-dimensional representations of fixtures that may give a more realistic impression of the actual surrounding, such as the actual vegetation, may be relatively rough-textured and unclear. Therefore, a need exists for an efficient solution for the management, storage and display of synthetic representations of fixtures or elements that convey a realistic digital impression of the physical environment.

SUMMARY

A vehicle navigation system guides a driver to a destination by enhancing the visualization of landmarks and intersections. The navigation system stores scalable and compact graphic objects as representations of fixtures or other static elements. The graphic object representations may be used to render perspective views of the fixtures to yield more realistic views. The storage, selection, and generation of the graphic objects may reduce computational processes and enhance image quality.

A graphical object may correspond to a fixture or static element of a digital map that provides routes and navigational information. The graphical object may be stored in an object database arranged for ease and speed of search and retrieval. The graphic objects may be classified into a class and at least one sub-class. The classification data may be used to select and generate graphical objects that may be used in navigation systems.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
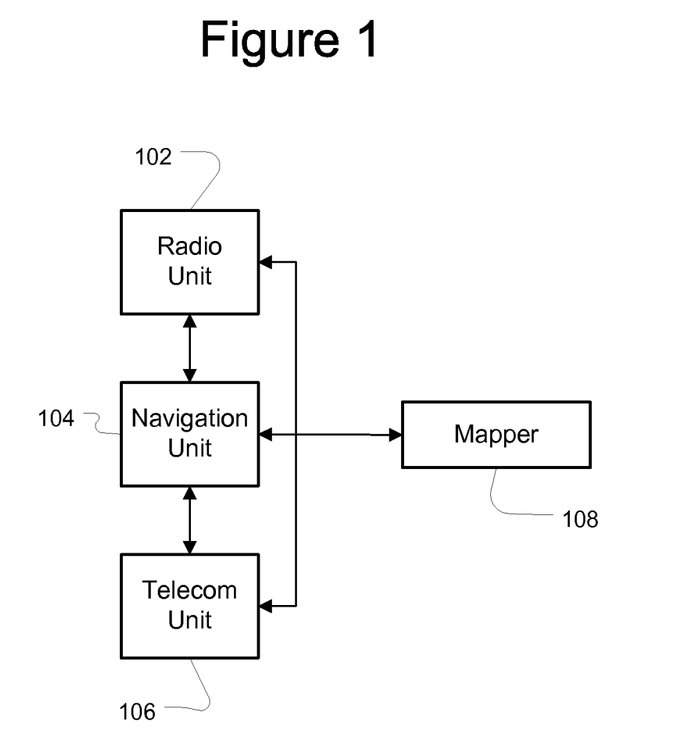
FIG. 1 is a block diagram of a vehicle interface.

FIG. 1 is a block diagram of a vehicle interface. The vehicle may include an automobile, such as a car, truck, or motorcycle, or may include any device for transporting people or things. The interface may comprise a navigation system 104 in communication with a radio unit 102, a telecom unit 106 and a mapper 108. The interface allows a user to provide information or receive information from the radio unit 102, navigation unit 104, and/or telecom unit 106. The mapper 108 may provide maps and features that are displayed by the navigation unit 104.

The navigation unit 104 may provide maps with directions and preferred route information to a destination that guide a driver by enhancing the visualization of upcoming landmarks and intersections. A Global Positioning System (GPS) may be used to locate a user's position that is displayed on the map. The navigation unit 104 may store scalable and compact vector graphics representations of landmarks and intersections that may be derived from the digital images of landmarks or other geographical features. The vector graphics representations may render perspective views of landmarks and intersections that may change as drivers approach or travel away from them in route to a destination. Vector graphic representations in maps is further described in U.S. patent application Ser. No. 11/829,441, filed Jul. 27, 2007, entitled "NAVIGATION SYSTEM WITH INTERSECTION AND THREE-DIMENSIONAL LANDMARK VIEW," which is hereby incorporated by reference, may be used.

The navigation unit 104 may include a Bluetooth interface and/or a wide local area network (WLAN) interface to improve the variability and functionality of the speech input. The driver may carry a headset or hands-free device linked to the navigation unit 104 through a wireless protocol, such as a short range (e.g. 10 meters) and low speed (up to 1 Mbps) wireless protocol like Bluetooth. In these systems, the receiver may be positioned close to the user's mouth, so the quality of the speech signal to be recognized is improved.

Figure 2:
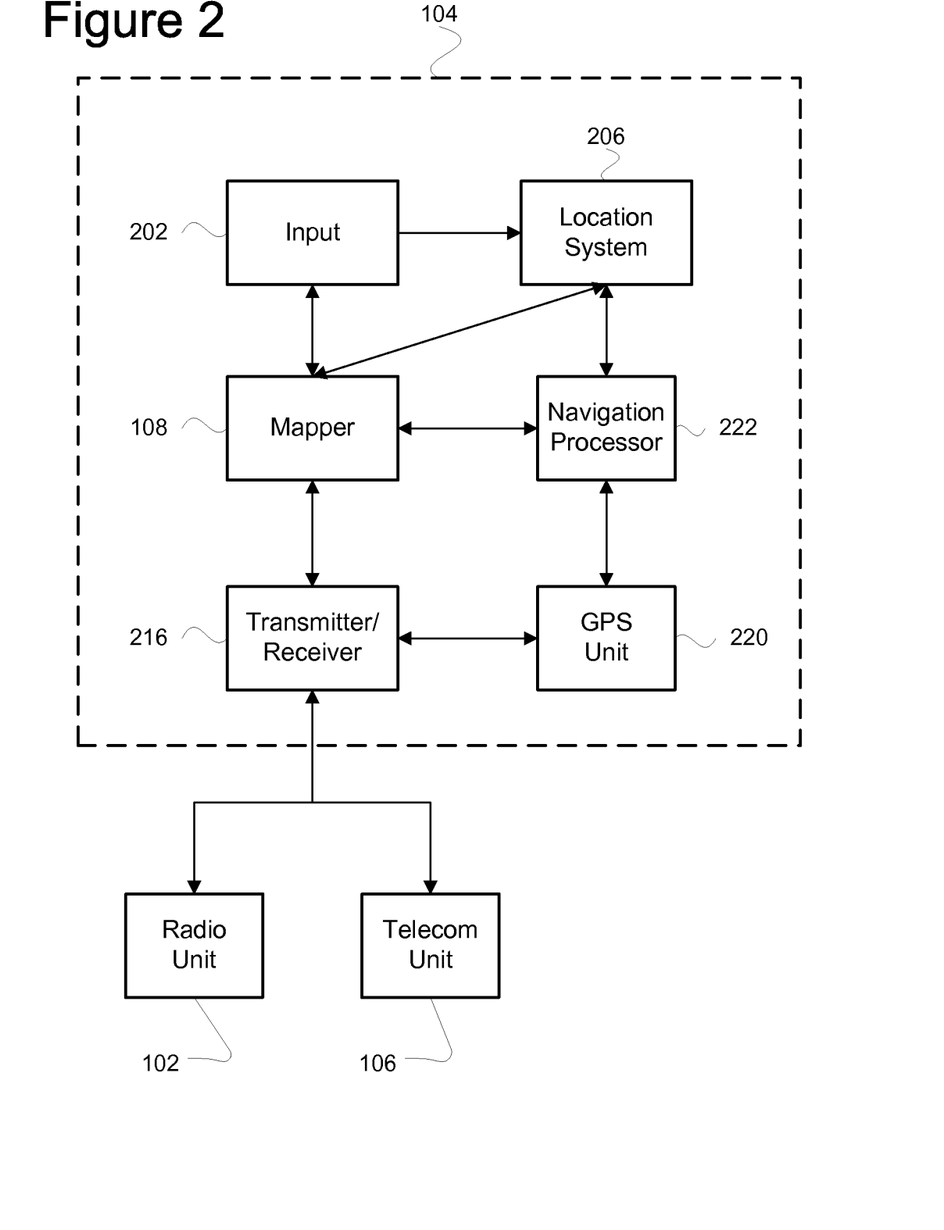
FIG. 2 is a block diagram of a navigation unit.

FIG. 2 is a block diagram of the navigation unit 104. An input 202 communicates with a location system 206 and the mapper 108. A navigation processor 222 communicates with a GPS unit 220 and the location system 206. A transmitter/receiver 216 (e.g., transceiver) may communicate with the GPS unit 220, the radio unit 102 and/or a telecom unit 106.

The navigation system 104 receives data through an input 202. The input 202 may receive geographic, navigational, or directional data that may be used to render a map and other navigational information. A user may enter a destination address as in input 202. The navigation system 104 may receive input 202 through buttons, voice recognition, a keyboard, a keypad, or through a touchscreen display. In some systems, the input 202 may not be received by the driver while driving.

The input 202 may be in communication with a location system 206 which determines the position and speed of the vehicle. The location system 206 may also calculate a route for a destination address. The location system 206 may be in communication with the mapper 108 that selects the appropriate map based on a current position and speed and/or based on a destination position. In one system, the location system 206 is in communication with the navigation processor 222, and a global positioning system (GPS) unit 220. The GPS unit 220 may determine the location of the vehicle. Vehicle location data may be processed by the navigation processor 222. The navigation processor 222 may communicate with the mapper to develop navigation directions and determine which maps and fixtures may be displayed. The directions and images that comprise the maps may be displayed. The GPS unit 220 may communicate with the transmitter/receiver 216 to receive and send information, such as the GPS location of the vehicle.

The transmitter/receiver 216 may communicate with the mapper 108 to transmit a map or a file comprising navigational directions. The transmitter/receiver 216 may receive incoming data or files that are stored by the navigation unit 104. For example, map or navigation updates including construction information may be received by the transmitter/receiver 216 and communicated to the mapper 108 which may then be stored in a non-volatile memory. The transmitter/receiver 216 may receive and send data to the radio unit 102, telecom unit 106, or other network server or communication port (not shown). The data may be transmitted as an analog signal by the radio unit 102, or transmitted through a digital protocol through a wireless network through the telecom unit 106. In one system, GPS information may be transmitted through the radio unit 102, the telecom unit 106, or a different GPS server (not shown). In one system, the telecom unit 106, the radio unit 102 and the transmitter/receiver 216 may comprise one device configured to communicate outside of the vehicle.

The radio unit 102 may comprise an electronic circuit or device used to select signals for amplification and convert analog or digital signals into sound. The radio unit 102 may transmit and receive a wide variety of signals using various frequency ranges and types of modulation. For example, the radio unit 102 may receive amplitude modulated (AM) or frequency modulated (FM) broadcasts, or other broadcasts.

The telecom unit 106 may connect to a telephone or wireless network that may transmit or receive data over a publicly and/or privately accessible network. The telecom unit 106 may communicate over a wireless fidelity (Wi-Fi) network, short messaging service (SMS) network, or a wide area network (WAN), that may interface one or more interconnected networks that make up the Internet. The wireless network may be a cellular telephone network, a network operating to a protocol such as IEEE 802.11, 802.16, 802.20, or WiMax network. The network may utilize a variety of networking protocols now in use or later developed including, but not limited to TCP/IP based networking protocols.

Figure 3:
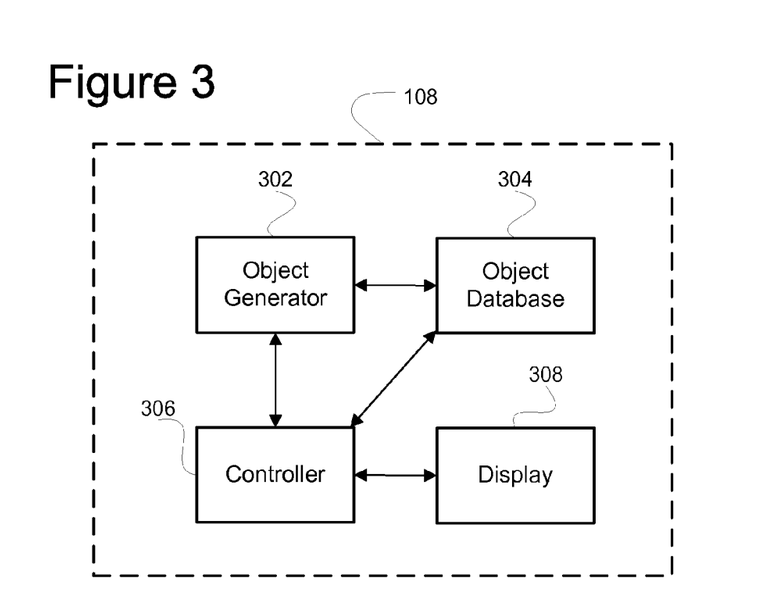
FIG. 3 is a block diagram of mapping components.

The mapper 108 may be configured to a two dimensional, geometrically accurate representation of a three dimensional space that may be displayed by the navigation unit 104. FIG. 3 is a block diagram of exemplary mapping components. The mapper 108 may include an object generator 302, an object database 304, a controller 306, and a display 308. The mapper 108 may select and provide the background maps for a particular location, and may select and provide the additional fixtures to be displayed. The background map may include graphical representations of streets, intersections, bridges, terrain, bodies of water, parks, parking as well as building areas in two or three dimensions. A fixture may include a map feature, or a static physical element of a landscape or town, such as landmarks, signposts, streetlights, trees, plants, the skyline, or other static elements. The fixtures may be represented by a graphical objects inserted in or on top of a digital map. The graphical objects may be displayed in a two-dimensional view or in a three-dimensional view. In some systems, the graphical objects appear or mirror the viewpoint of a user. A two-dimensional display reduces the processor load, a three-dimensional perspective view may improve a driver's orientation and appear as a more realistic representation of the surrounding.

Figure 4:
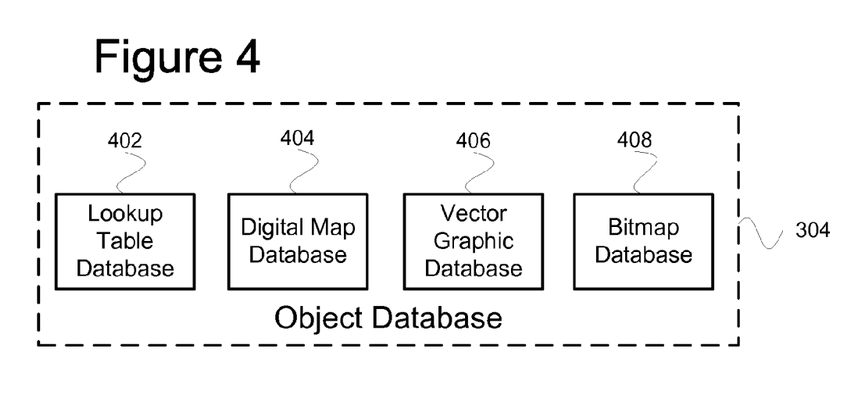
FIG. 4 is a block diagram of an object database.

The object database 304 in the mapper 108 may retain objects or graphics for display over or in a map. The graphics may include fixtures that are displayed in or on a map. The object database 304 may also store the maps, and any navigational or directional information used by the navigation unit 104. In FIG. 4, the object database 304 may include a lookup table database 402, a digital map database 404, a vector graphic database 406, and a bitmap database 408. In alternative systems, each of the lookup table database 402, the digital map database 404, the vector graphic database 406, and the bitmap database 408 may be separate databases, or may be a part of the object database 204. In one example, the lookup table database 402 may be a separate component that stores data related to objects rather than the objects themselves.

The digital map database 404 may contain data related to geographical and topographical information about or related to intersections, roads, and curves along a route. The vector graphics database 406 may contain two-dimensional or three-dimensional vector graphics representations of landmarks and intersections along a route. The vector graphic database 406 may include perspective calculation logic that renders the representations of the landmarks and intersections based on the vector graphics representations. The vector graphics database 406 may be updateable and the vector graphics may be generated in a format derived from an optimized algorithm that may limit computer resources of a vehicle navigation system. Data for each vector graphic may be stored in vector graphics database 406 that may comprise fields and operations for searching, sorting, recombining, and other functions on those fields. This data may be used for a relatively quick calculation of views of the vector graphic objects representing fixtures from different perspectives.

The bitmap database 408 may include objects that are generated and may be stored based on pixels that may form an image. The bitmap database 408 may store raster graphics that represent images as a collection of pixels, or may store objects as bitmap files. In some systems bit-mapped images comprise rows and columns of dots, and vector graphics may be represented as mathematical formulas that form all the shapes in an image. Vector graphics, based on mathematical functions, may be scalable. Vector graphics may require less disk space than bitmaps, since they may be calculated from relatively fewer data points that are stored. Vector graphics may be used to calculate and display three-dimensional perspective views of fixtures represented at predetermined positions by graphical objects in the digital map. The digital map may display graphical objects that may be composed of at least one bitmap and/or at least one vector graphic.

The lookup table database 402 may be part of a component of the object database 214. Alternatively, the lookup table database 402 may be a separate component from the object database 214. The lookup table database 402 may be in communication with the object generator 302, the controller 306 and/or the mapper 108. As described, the lookup table database 402 may be a part of the object generator 302.

Figure 5:
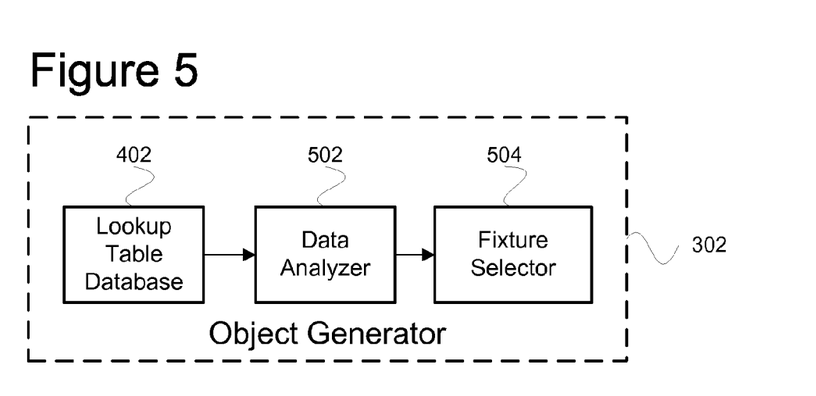
FIG. 5 is a block diagram of an object generator.

In FIG. 3, the object generator 302 may be configured to generate and/or select objects for display on a map. FIG. 5 illustrates an exemplary object generator 302. The object generator 302 may include the lookup table database 402, a data analyzer 502 and an object selector 504. The data analyzer 502 may process data from the lookup table database 402 that selects a fixture to be displayed by the fixture selector 504. The lookup table database 402 may include a classification of fixtures that is used for the selection of fixtures for a particular map.

Figure 6:
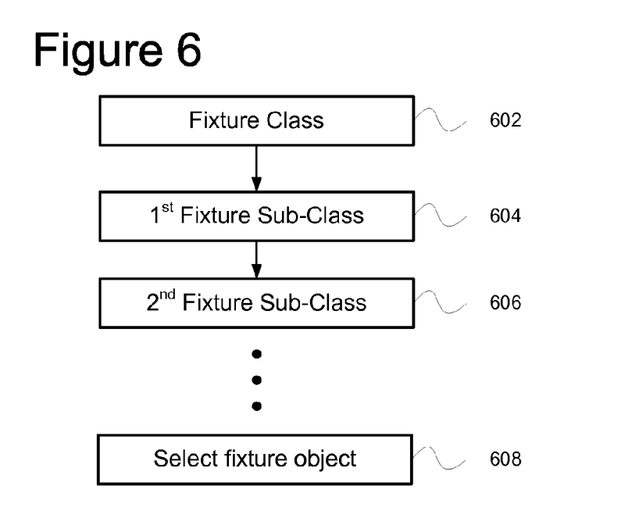
FIG. 6 is a flow diagram illustrating classification of objects.

FIG. 6 illustrates a classification of fixtures. The classification of fixtures may be stored in the lookup table database 402 that may be analyzed or linked to the data analyzer 502. Fixtures may be divided into fixture classes 602. For example, the fixture class 602 may be a class of vegetation, such as trees and bushes, or traffic signs, memorials or wells. Each fixture class may be sub-divided into fixture sub-classes. The fixture class 602 may be subdivided into a first fixture sub-class 604. For example, a class of trees may be divided into a first sub-class 604 that includes birches and oaks. The first fixture sub-class 604 may be further divided into a second fixture sub-class 606. The sub-class of birches may be further subdivided into the second sub-class 606 of silver birches, white birches, yellow birches, etc. Likewise, the first fixture sub-class 604 of oaks may be further subdivided into the second sub-class 606 bog oaks, cork oaks, common oaks, etc. There may be more or fewer sub-classes that are used to categorize and organize the fixtures for the selection of a fixture object 608 for display in a map.

At least one of the fixture classes or fixture sub-classes may be instantiated by generating at least one data representation of the fixture. The data representation may include a graphical object and the instantiation may be performed by generating a concrete instance of the respective fixture class or fixture sub-class. Accordingly, the data representation may be used within the framework of object oriented programming.

The lookup table database 402 may store data that is related to fixtures and may include specific information on the particular fixtures of a sub-class. For example, information on the color, height and texture of fixtures may be stored and accessed for more realistic renderings of the fixtures in maps. In addition, the data may contain statistical information on common exemplars of fixtures. For example, a common or typical height-to-width ratio of a fixture or the relative sizes of components of a fixture may be stored in the lookup table database 402. This information may be utilized when a graphical object representing a fixture is to be inserted in a digital map, but only the height is known by an operator or system that intends to insert the graphical object. Statistical information of the particular fixture to be represented by a graphical object is used for the actual generation of the graphical object by the object generator 502.

In one system, the information is received by the data analyzer 502 to compute and generate an accurate fixture based on the class/sub-classes of the fixture. The fixture may be combined or linked with statistical information that may be used for the rendering of a fixture. The fixture selector 504 may utilize the classifications to select a fixture and/or may utilize statistical information to generate a fixture. The data, such as the classes, statistical information or other parameters related to fixtures used for the generation of graphical objects may be stored rather than storing copies of entire geometries in order to reduce the demand for memory requirements.

In one example, if a large lime tree is represented by a graphical object at a predetermined position in a digital map, data in a fixture class for trees, a sub-class for lime trees and a further sub-class for large lime-trees may be stored in the lookup table database 402 and analyzed by the data analyzer 502. This data may comprise statistical data on typical or common large lime trees as the height-to-width ratio of the stem, the ratio of the diameter of the stem to the diameter of the crown of the tree, etc. The data analyzer 502 may determine the data that is used to generate the tree and the fixture selector 504 generates the large lime tree based on the statistical information.

Data associated with a class or a graphical object may be stored in variables. For example, the class "trees" may include variables for the origin width and height of a graphical representation of a tree. The class may also include a method for calculating an area covered by the graphical representation of a tree, a traverse of a polygon structure used for drawing the graphical object.

At least one graphical object may be generated on the basis of the data read from the lookup table database 402 and assigned to a position determined in the map. The assignment may include establishing a reference, such as with a pointer to the graphical object based on coordinates used in the digital map. The coordinates may be geographical coordinates, GPS coordinates, or proprietary coordinates used for managing the data presented in the digital map. The graphical object may be displayed at the determined position. The determination of the position may be performed in response to a manual location input or automatically based on previously read location data that may be provided. The manual location input may be performed by a pointing device, such as a computer mouse, or a keypad, keyboard or a touch screen.

Modifications of the data stored in the lookup table database 402 corresponding to classes or sub-classes of graphical objects may affect each object. The lookup table database 402 may be customized and adapted to particular target systems depending on the available hardware resources and software applications. In particular, design updates for the graphical objects or a new design, such as for a recent release of a navigation software, may be utilized without re-positioning of the graphical objects in or that may overlay the map.

A user of the navigation system that accesses a digital map database may enter new graphical objects directly or through software into the navigation system. A user may download fixtures through a network connection and store the fixtures or a reference to the fixtures into the lookup table database 402. The downloaded fixtures may then be available for display. Construction updates may be transmitted and stored in the system automatically or in response to a user request. Maps and fixture that are later displayed may reflect those updates.

In FIG. 3, the controller 306 is in communication with the object generator 302 and the object database 304. The controller 306 may manage the generation, selection, and storage of objects, such as fixtures. In particular, the controller 306 may receive instructions on which objects that should be used on the display 308. If the object is stored in the object database 304, it may be displayed on the display 308. If the object is not stored in the object database 304, the object generator 302 may generate the object. The objects may comprise any component that is displayed on a map or a navigational display, including fixtures and other static elements.

The display 308 is configured to display information to the user, such as a map, including geographical features, fixtures, and navigation or directional information. For example, the display 308 may present maps and directions from the navigation unit 104 that include various fixtures. The display 308 may comprise a liquid crystal display (LCD), an organic light emitting diode (OLED), a flat panel display, a solid state display, a cathode ray tube (CRT), or other now known or later developed display device for outputting determined information. The display 308 may display the time, or radio station data, CD data, or MP3 data that is played through speakers (not shown). The display 308 may display maps, routes, or other location related data received from the telecom unit 106. The display 308 may comprise a touch screen allowing further interaction from the user. For example, the user may be able to modify or alternate the maps and the fixtures that are displayed from the navigation unit 104.

Figure 7:
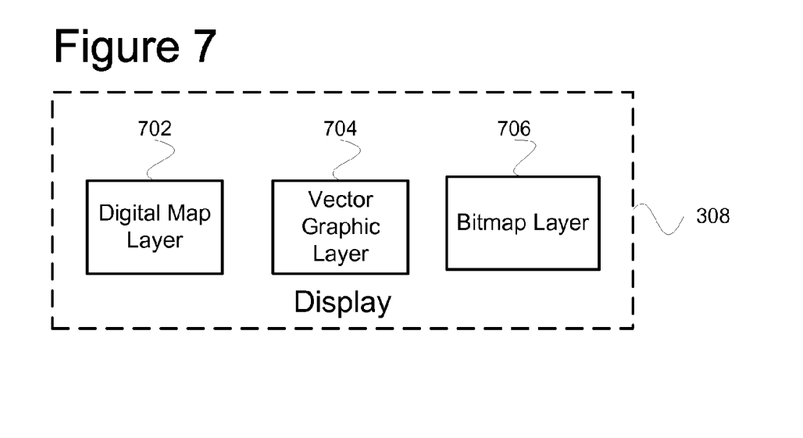
FIG. 7 is a block diagram of a display.

FIG. 7 illustrates the display 308. In particular, the display 308 is in communication with the navigation unit 104 and displays maps and navigational directions. The maps and other features or fixtures may be displayed in different layers, such as a digital map layer 702, a vector graphic layer 704, and a bitmap layer 706. The digital map layer 702 may include the streets, intersections and other map features. The vector graphic layer 704 may include certain fixtures that are generated by the object generator 302 and selected by the controller 306. The bitmap layer 706 may include those objects that are displayed as bitmap images rather than vector graphics. The use of different display layers may facilitate an efficient and reliable process of displaying different kinds of digital objects concurrently. For example, the digital map layer 702 may display background objects and the graphic layer 704 may display objects that are subject to change. The bitmap layer 706 may display objects that do not change as the route and location change because a bitmap image may require more processing and memory to change the image on the fly.

Figure 8:
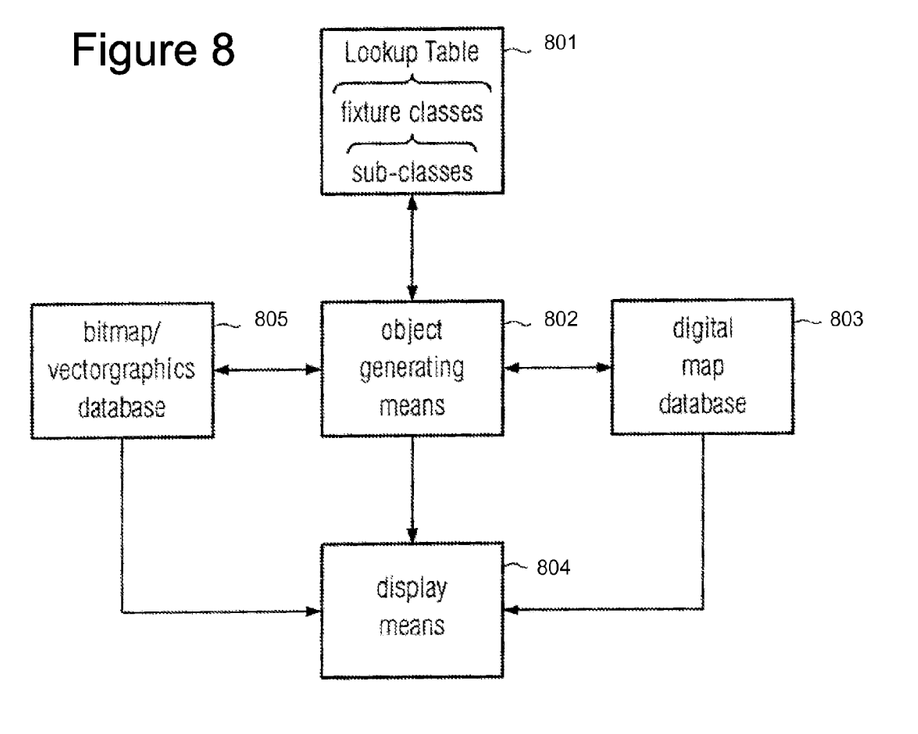
FIG. 8 is a block diagram of a navigation system.

FIG. 8 illustrates components of a navigation system. The navigation system may be used in a vehicle configured to display graphical objects corresponding to static elements (e.g. fixtures in a digital map). The navigation system comprises a database 801 storing at least one lookup table which includes information on fixture classes and fixture sub-classes, as described above with respect to FIG. 6.

An object generating means 802, such as the object generator 302, may allow for the generation of at least one graphical object corresponding to at least one fixture. The object generating means 802 may receive corresponding data from the lookup table. In order to generate a traffic sign indicating a speed restriction area, e.g., information of a class "traffic signs" and a sub-class "speed limit: 50 km/h" may be looked up in the database 801 including the above mentioned lookup table that is stored in the database 801. Subsequently, the graphical object, e.g., the traffic sign with white field and a black "50" is generated and inserted in a digital map at a predetermined position. The traffic sign is a fixture that is included in the digital map for creating a realistic and accurate display of the environment, which may aid in providing routes and images for navigating.

The object generating means 802 may exchange data with a digital map database 803 to determine where the generated graphical object representing the traffic sign should be placed. The object generating means 802 may be the object generator 302. The object generating means 802 may provide a display means 804, such as the display 308, with information about what graphical object is to be displayed at what position in a digital map shown to a driver of a car that is equipped with the navigation unit for route guidance. A control means (not shown), such as the controller 306, may alternatively read out the needed data from the digital map database 803 and may receive data about the generated graphical object from the object generating means 802 to instruct the display means 804 to display the generated graphical object at the predetermined position in the digital map.

Parameters for the fixtures to be represented by graphical objects as bitmap objects and/or vector graphic objects may be stored in a lookup table in a database 805. Changes in these parameters may result in a different appearance of the displayed graphical objects previously generated by the object generating means 802. For example, buildings may be represented by rectangular shapes and trees and bushes by circular shapes. Other representations may be based on recursive methods of geometrical modeling that allow for displaying even individual leaves of trees or polygon structures comprising an alpha texture, e.g. an image structure partly made of three color pixels (red, green, blue) and transparent pixels which define the transparency of the displayed image pixel by pixel.

Figure 9:
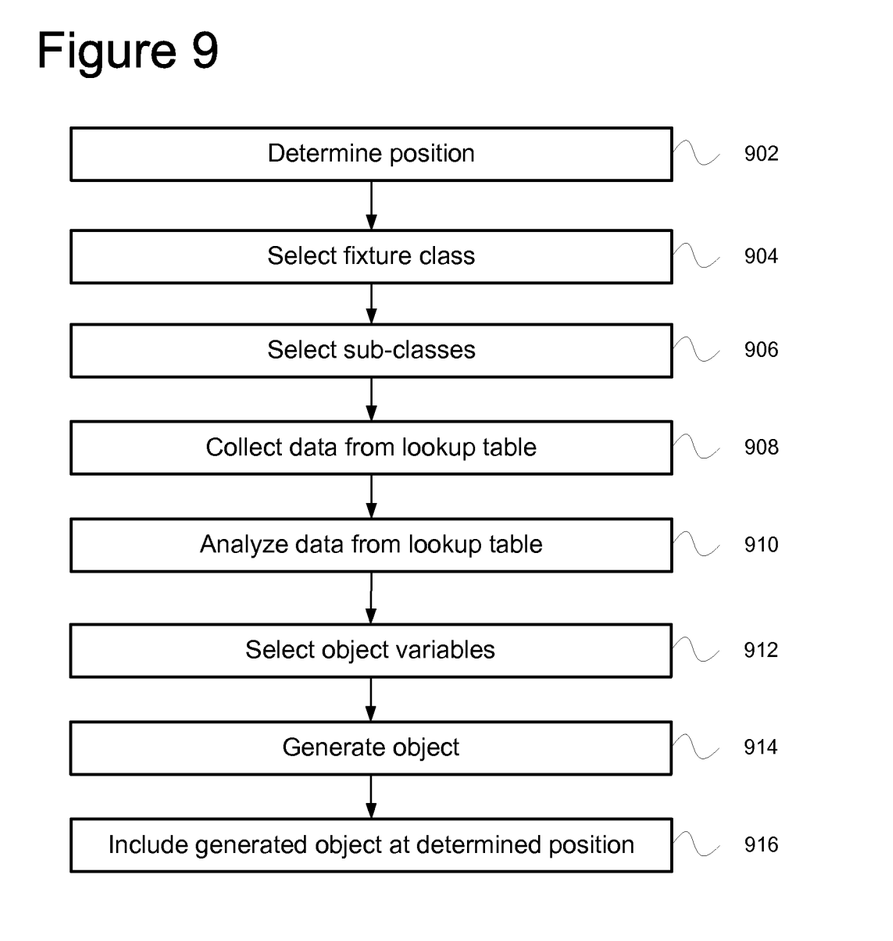
FIG. 9 is a flow diagram illustrating an object added to a map.

FIG. 9 is a flow diagram illustrating an object added to a map. In block 902, a position is determined on a digital map for including a graphical object, such as a fixture. In block 904, the class of the fixture is determined and selected and in block 906, a sub-class of the fixture is determined and selected. Alternatively, there may be more of fewer sub-classes of objects. The class and sub-classes may be used to narrow down the available fixtures that may be inserted into a digital map. In addition, data from a lookup table, such as the statistical information, may also be collected and analyzed when selecting a fixture as in blocks 908 and 910. The data may include statistical information such as shape, ratio, height, width, depth, or other size information. For example, the size parameters of a tree or traffic sign may be analyzed for including those fixtures in the digital map, so that they are properly proportioned. In block 912, the object variables that may define the object or fixture are selected. The object variables may include the data from the lookup table, as well as the classification of the object. Based on the object variables, the object or fixture may be generated in block 914. Alternatively, if an existing object, such as in the object database is available that matches the object variables, then that object may be inserted into the digital map rather than generating the object. In block 916, the generated object may then be inserted into the determined position of the digital map.

Figure 10:
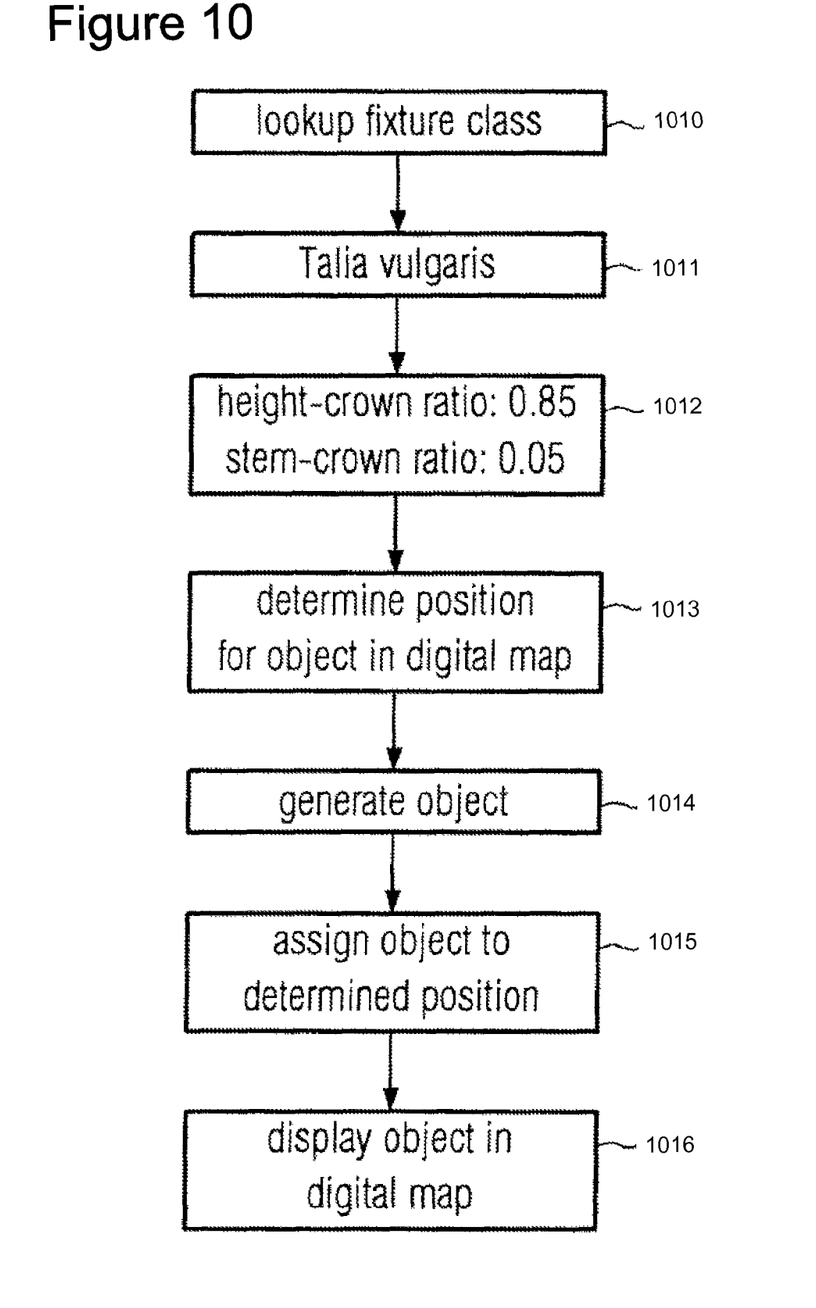
FIG. 10 is flow diagram illustrating the inclusion of a fixture in a map.

FIG. 10 illustrates an exemplary process of including a fixture in a map. In one example, a fixture may be a lime tree. FIG. 10 illustrates inserting a particular lime tree at a predetermined position in a digital map. In block 1010, the class "trees" is looked up and according to this example, it includes sub-classes identified by the Latin names of tree species, e.g., *Abies alba, Juglans regia, Pinus, Quercus, Talia*, etc. These sub-classes include information on the different species, such as information related to the size of the stem and the color and shape of the barks and the leaves.

Further sub-classes may be present including even more specified information on sub-species, e.g., *Pinus cembra, Pinus nigra, Pinus pinea* etc. In one example, the sub-class *Talia vulgaris* is chosen in block 1011 for reading information on the fixture to be represented by a graphical object in a digital map, such as a city map. The information may include data in block 1012 on the ratio of total height of the tree, or the exemplar of the *Talia vulgaris*, to the diameter of the crown of the tree 0.85. The information may also include the ratio of the diameter of the stem to the diameter of the crown of the tree 0.05. Similar data may be included in the lookup table, such as 1) for Acer, a ratio of the total height of the tree to the diameter of the crown of the tree 1.25 and ratio of the diameter of the stem to the diameter of the crown of the tree 0.06; or 2) for Robinia, a ratio of total height of the tree to the diameter of the crown of the tree 1.45 and ratio of the diameter of the stem to the diameter of the crown of the tree 0.03.

The modeling of a particular tree, e.g. a lime tree, with a vector graphic may be carried out on the basis of statistical evaluations of lime trees. If, for example, additional information is given on the diameter of the crown of the tree that is to be represented by a graphical object with the statistical information given in the sub-class for *Talia vulgaris* the height and diameter of the stem may be deduced and used for the graphical representation in a digital map.

After or before the information for the graphical object representing an exemplar of *Talia vulgaris* that is to be generated may be read from the lookup table, the position at which the graphical object is to be placed in the digital map may be determined in block 1013. The graphical object is generated in block 1014 based on the data in blocks 1011-1012 that was read from the appropriate class looked up from the lookup table in block 1010. The graphical object may then be assigned in block 1015 to the determined position. The graphical object may be assigned to the coordinates used in the digital map. The assigned graphical object may be displayed in block 1016 in the digital map at the proper position. Different display layers may be used for the display of the graphical object and the other elements of the digital map.

The methods discussed above may be encoded in a signal bearing medium, a computer readable medium such as a memory, programmed within a device such as one or more integrated circuits, one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM", a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for to insert at least one a graphical object corresponding to a fixture in a digital map comprising:
   providing data relating to at least one a fixture class in a lookup table database, where the data includes statistical information about characteristics of a graphical object representing the fixture to be generated;
   determining at least one a position in the digital map;
   retrieving the data related to the at least one fixture class stored in the lookup table database;
   computing a value for a first piece of statistical information for the graphical object based on a second piece of the statistical information for the fixture class in the lookup table database;
   generating at least one the graphical object based at least in part on the computed value for the first piece of statistical information for the graphical object representing the at least one fixture based on the statistical information included in the data related to the at least one fixture class stored in the lookup table database;
   inserting the graphical object at the determined at least one position on the digital map; and
   displaying a geometrically and dimensionally accurate representation of the graphical object at the determined at least one position.

2. The method according to claim 1, the method further comprising:
   storing data related to at least one a sub-class of the at least one fixture class.

3. The method according to claim 2, wherein the at least one graphical object representing the at least one fixture is further generated based on the data related to the at least one fixture sub-class.

4. The method according to claim 1, further comprising:
   storing the graphical object in an object database; and
   updating the lookup table database to include a reference to the graphical object.

5. The method according to claim 4, further comprising:
   storing, when the graphical object is a bitmap, the bitmap in a bitmap database; and
   storing, when the graphical object is a vector graphic, the vector graphic in a vector database.

6. The method according to claim 1, further comprising:
   displaying a digital map; and
   displaying the at least one graphical object on one display layer and at least a part of the digital map on another display layer, where the digital map is on a different display layer than the graphical object.

7. The method according to claim 6, wherein the at least one graphical object represents at least one the fixture, where the at least one fixture comprises plants, traffic signs, traffic lights, street lighting, buildings, or landmarks and further where the digital map is a digital city map.

8. The method according to claim 1, wherein the at least one graphical object is displayed in a two-dimensional view or in a three-dimensional perspective view.

9. The method according to claim 1, wherein the statistical information includes relative shape, height, width, depth, or other size information describing the characteristics of the graphical object to be generated.

10. A system, comprising:
a computer processor; and
a memory containing a program which when executed by the processor,
performs an operation to insert a graphical object corresponding to a fixture in a digital map, the operation comprising:
providing data relating to a fixture class in a lookup table database, where the data includes statistical information about characteristics of a graphical object representing the fixture;
determining a position in the digital map;
computing a value for a first piece of statistical information for the graphical object based on a second piece of the statistical information for the fixture class in the lookup table database;
generating the graphical object based at least in part on the computed value for the first piece of statistical information for the graphical object;
inserting the graphical object at the determined position on the digital map; and
displaying a geometrically and dimensionally accurate representation of the graphical object at the determined position.

11. The system of claim 10, wherein the graphical object is further generated based on data related to a sub-class of the fixture class.

12. The system of claim 10, the operation further comprising:
storing the graphical object in an object database; and
updating the lookup table database to include a reference to the graphical object.

13. A computer program product, comprising:
computer-readable program code which when executed by a processor performs an operation comprising:
providing data relating to a fixture class in a lookup table database, where the data includes statistical information about characteristics of a graphical object representing the fixture;
determining a position in the digital map;
computing a value for a first piece of statistical information for the graphical object based on a second piece of the statistical information for the fixture class in the lookup table database;
generating the graphical object based at least in part on the computed value for the first piece of statistical information for the graphical object;
inserting the graphical object at the determined position on the digital map; and
displaying a geometrically and dimensionally accurate representation of the graphical object at the determined position.

14. The computer program product of claim 13, wherein the graphical object is further generated based on, data related to a sub-class of the fixture class.

15. The computer program product of claim 13, the operation further comprising:
storing the graphical object in an object database; and
updating the lookup table database to include a reference to the graphical object.

* * * * *